Sept. 15, 1942.  J. R. GILLBERGH  2,295,738
METHOD AND MEANS FOR DETERMINING THE POINTS OF INGRESS OF WELL FLUIDS
Filed Dec. 16, 1940  4 Sheets-Sheet 1

INVENTOR
JOHN R. GILLBERGH
BY HARRIS, KIECH, FOSTER & HARRIS
FOR THE FIRM
ATTORNEYS.

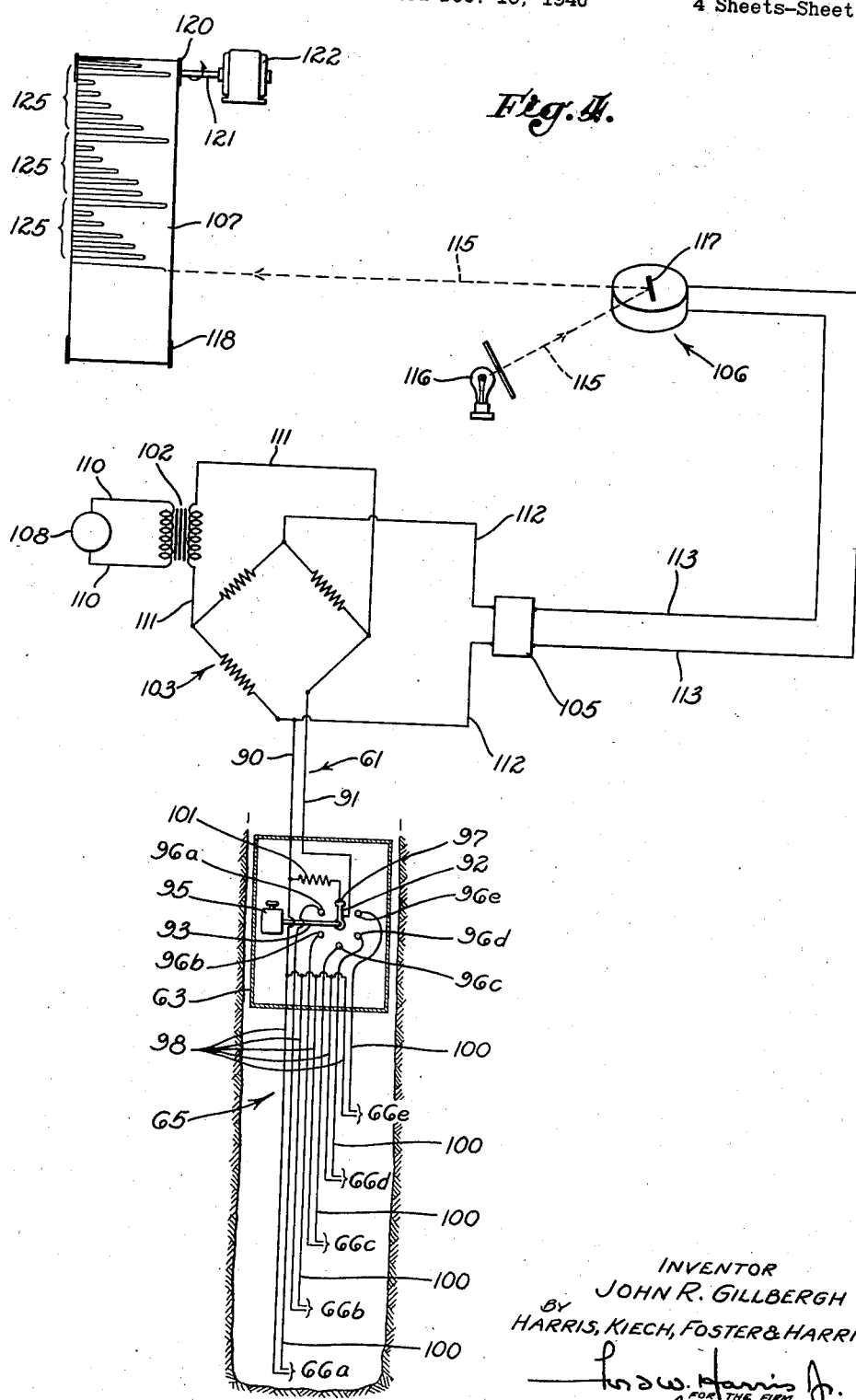

Sept. 15, 1942.  J. R. GILLBERGH  2,295,738
METHOD AND MEANS FOR DETERMINING THE POINTS OF INGRESS OF WELL FLUIDS
Filed Dec. 16, 1940  4 Sheets-Sheet 3

INVENTOR
JOHN R. GILLBERGH
BY
HARRIS, KIECH, FOSTER & HARRIS
ATTORNEYS.

Sept. 15, 1942.  J. R. GILLBERGH  2,295,738
METHOD AND MEANS FOR DETERMINING THE POINTS OF INGRESS OF WELL FLUIDS
Filed Dec. 16, 1940  4 Sheets-Sheet 4
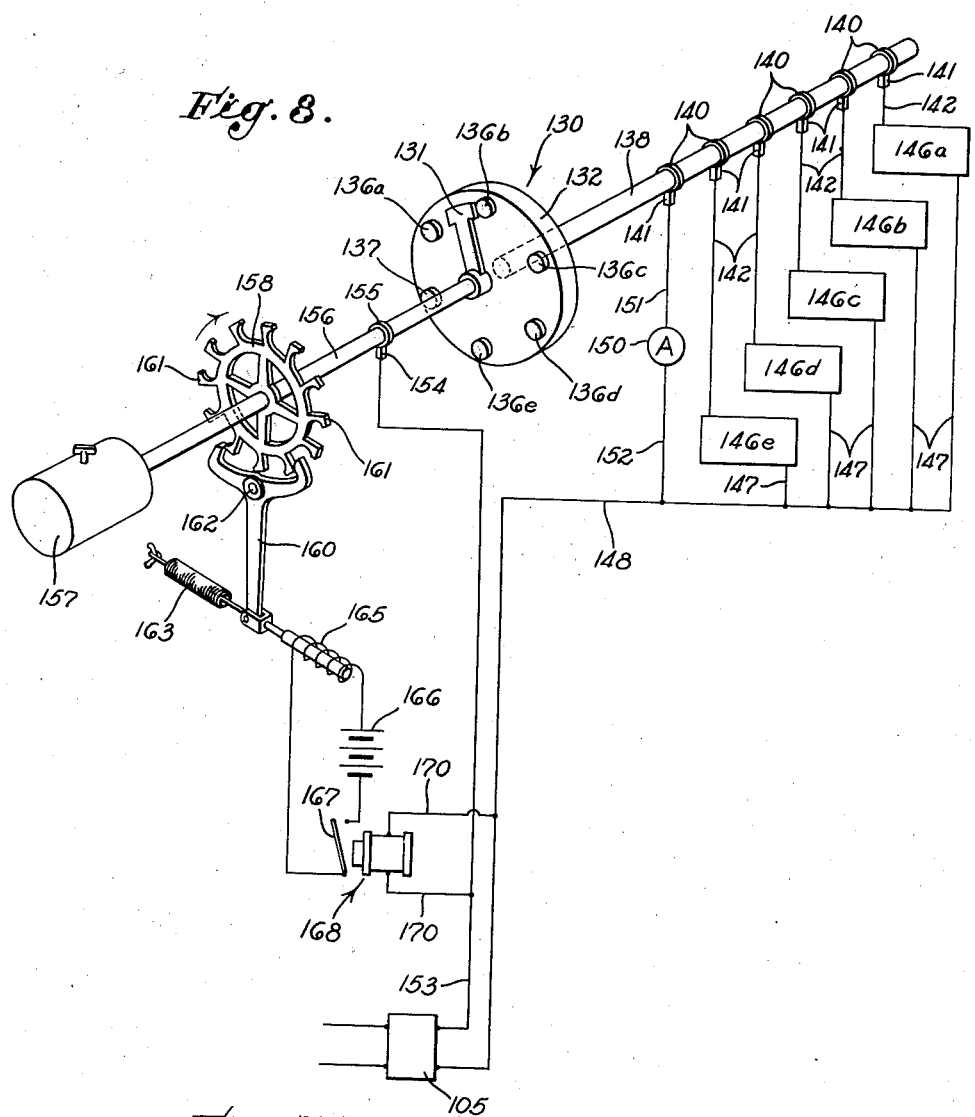
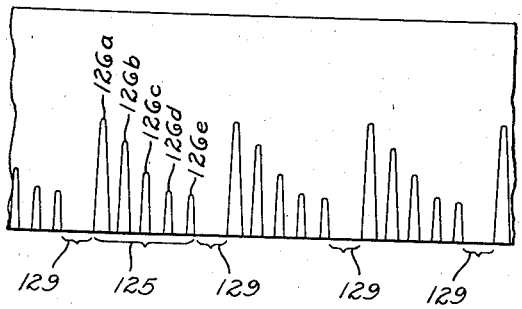
INVENTOR
JOHN R. GILLBERGH
BY HARRIS, KIECH, FOSTER & HARRIS
FOR THE FIRM
ATTORNEYS.

Patented Sept. 15, 1942

2,295,738

UNITED STATES PATENT OFFICE 2,295,738

METHOD AND MEANS FOR DETERMINING THE POINTS OF INGRESS OF WELL FLUIDS

John R. Gillbergh, Palo Alto, Calif.

Application December 16, 1940, Serial No. 370,251

20 Claims. (Cl. 175—182)

My invention relates to the art of exploring deep well bores with special reference to the characteristics and states of fluids therein and is particularly directed to the problem of locating the various levels of fluid ingress. While the principles involved may be practiced in various methods and apparatus for various purposes, it is believed the invention will be most widely applied to the location of water intrusion in oil wells. Since outstanding advantages appear in this latter application of the invention, I elect to direct my disclosure specifically to the problem of exploring an oil well to ascertain sources of water encroachment, no limitation being implied by my election.

The present invention is directed to improvements on the method and apparatus set forth in my copending application Serial 249,266, now Patent No. 2,248,982 of July 15, 1941, entitled "Method and apparatus for determining the character and points of ingress of well fluids." Said prior disclosure, which is to be considered as a part of the present disclosure, discusses the disadvantages of the prior art practice of employing a single moving fluid-character-responsive means in determining flow conditions in a bore hole and teaches instead the use of a plurality of such responsive means at fixed levels in the bore hole.

The general object of the present invention is to simplify the apparatus and procedure for using the multiple fluid-character-responsive means. Emphasized in my prior disclosure is the concept of recording all the significant changes in fluid character at the various subterranean points throughout a given test period so that the fluid pattern of the well and the points of fluid ingress in the bore hole may be ascertained by comparing the flow histories at the selected test points. To produce reliable test data and to reduce the test period to a relatively short interval, it is essential that the derived histories be concurrent through a critical test period, and it is further essential that the histories be complete through that period.

In the practice set forth in my prior disclosure the attainment of adequate concurrent histories is assured by making strictly continuous records of fluid-character changes at the various test points throughout the test period, all of the continuous records being made strictly simultaneously. Literal continuity and literal simultaneity as achieved in my earlier disclosure require separate circuits from the various stations to a common indicating and/or recording station. In such a practice an indicating or recording station at the top of the well is possible only if it is practical to extend numerous conductors from the subterranean test zone to the surface. Since a long multiple-conductor cable is relatively expensive, tends to deteriorate under tensile stress and high pressure, and is both bulky and heavy, and since the tubing valves and/or subsurface packer devices present difficulties in some test procedures, an operator is forced under some of the practices disclosed in my earlier application to forego direct transmission of test data to the surface of the well during the test period. In such situations it is necessary as disclosed in my prior application to place an automatic recording station at a subterranean point for service throughout the test period.

An important object of the present invention is to avoid the necessity for multiple circuits between the test zone and an indicating or recording station at the surface. More specifically, my object is to provide a simple test system by virtue of which data from multiple subterranean test points may be transmitted directly to the top of the well through a simple single-circuit cable. The cable may comprise, for example, a single insulated conductor encased in a sheath of conducting material, the sheath serving as one side of the circuit. Such a cable is of simple construction, relatively small in cross-section, rugged, and easy to manipulate. Sufficient length of the cable for a deep well may be wound on a relatively small drum convenient to transport from well to well. The cable may be readily attached to the outside of tubing and even run through packing if it is desirable to circumvent tubing valves or packer installations.

Underlying the present improvement is the novel concept that the required test data may be obtained by intermittent determinations made at the various test points taken in rapid sequence. In other words, I propose to obtain the required test data by continual recurrent determination of fluid character at any one stationary test point instead of strictly and literally continuous determination, and by what may be termed contemporaneous determination at the various test points instead of strictly and literally simultaneous determination. By using the term contemporaneous, I mean that the determinations of the fluid character at the various test points are concurrent and are made incessantly throughout the same test period. The determinations approach continuity sufficiently to serve my purpose just as well as absolute continuity, and if the contemporaneous determinations are considered in the light of the test period as a whole, it is not straining language to state that the indicative values are taken simultaneously at the test points.

The adequacy of recurrent determination incessant through a test period depends upon the frequency of the individual determinations relative to the rate and duration of the changes in fluid character that must be identified by the test data. If the intevals between determinations are less than the minimum duration of any significant flow phenomenon, then all significant flow phenomena will be reflected in the series of determinations. Extensive experience in testing oil wells for water intrusion leads me to believe that any significant alteration in fluid character at a subterranean point can be expected to endure for several seconds; therefore, no significant change in fluid character can escape a series of determinations taken at, say, less than three-second intervals. The time scale, of course, may be expanded or contracted within the expected skill of one versed in the present art. The frequency of the determinations may be relatively high when necessary to reflect exceedingly rapid changes in the well fluids, or, on the other hand, the movement of fluids in the well may be so retarded, for example, by means disclosed in my copending application, as to make permissible intervals of several seconds between the recurrent determinations of fluid character at any one test point.

In applying this concept of discontinuous but recurrent fluid-character determination, I employ a subterranean cyclic means or commutator to place the indicating or recording circuit in communication successively with the various fluid-character-responsive means in the well. The resultant composite series of values transmitted to the surface of the well through the single circuit must be broken down into component series corresponding to the individual test points in the well. The obvious expedient to segregate the individual component series of values would be to provide a second commutator at the surface of the well synchronized with the subterranean commutator and such an expedient may be employed in some practices of the invention. An important object in the preferred practice of my invention, however, is to obviate the necessity of a second commutator for the allocation of the transmitted values to the individual test points. A further object is to provide a single composite record for the multiple test point of such character as to serve the purpose of multiple records made simultaneously. Such a composite record may be self-sufficient for direct comparison of the test points or may be adapted for the derivation of the component series at leisure after a test is finished.

The above and other objects and advantages of my invention will be apparent in my detailed description to follow, taken with the accompanying drawings.

In the drawings which are to be considered as illustrative only:

Fig. 4 is a diagrammatic representation of one form of my improved recording apparatus;

Fig. 7 shows a record as produced by a modification of the apparatus of Fig. 4; and Fig. 8 is a diagram indicating how the recording apparatus of Fig. 4 may be modified in one practice of my invention.

Figure 1:
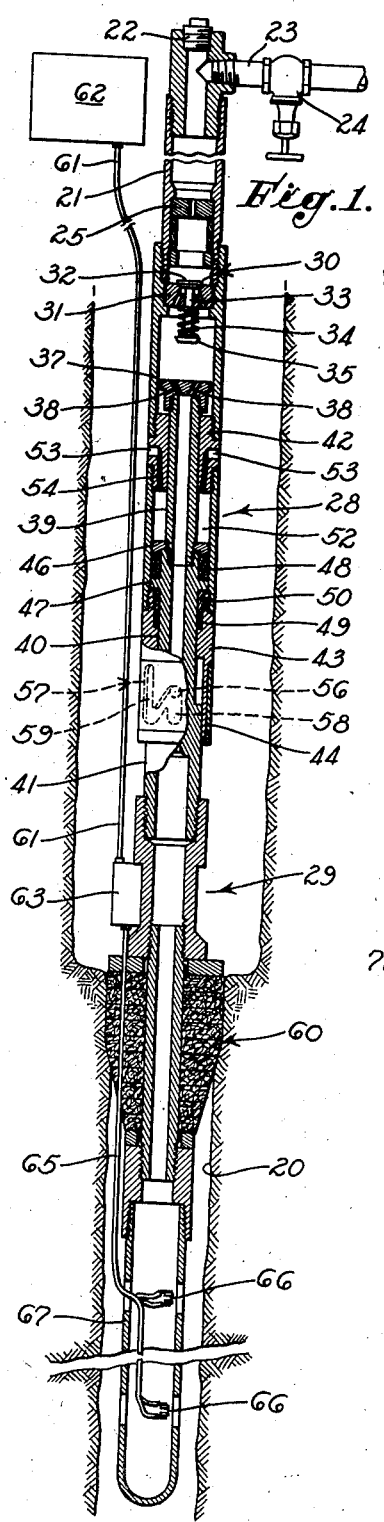
Fig. 1 is a diagrammatic section of one form of my apparatus installed in a bore hole.

Fig. 1 shows an uncased bore hole, the lower portion of which is of reduced diameter. In a typical situation it is known that both water and petroleum fluids are produced in this lower restricted portion of the bore hole 20 and the problem is to ascertain the points of water ingress. The apparatus for exploring this lower portion of the bore hole 20 is incorporated in a string 21 of drill pipe or tubing, the string being divided into an upper section and a lower section that are telescoped together for relative longitudinal movement. The top of the string 21 is closed by a plug 22 and is provided with a discharge pipe 23 controlled by a valve 24. At some point in the string 21 is a flow bean 25 to restrain upward flow therethrough.

The upper section of the string 21 is generally designated 28 and the lower section is generally designated 29. Toward the lower end of the upper section 28 is a valve generally designated 30, comprising a seat member 31 and a valve member 32 having a stem 33 with a head 35. The valve is continuously urged toward closed position by a suitable spring 34 acting between the seat member 31 and the head 35 of the valve stem.

The upper end of the lower section 29 of the tubing string terminates in a bushing 37 that is adapted to cooperate with the head 35 of the valve stem 33 to open the valve 30, the bushing having a plurality of inclined bores 38 for the passage of fluid when the valve is held open. The bushing 37 is mounted on the upper end of a tubular guide portion 39 of reduced diameter that in turn is mounted on a guide portion 40 of intermediate diameter, and just below the guide portion 40 is a third guide portion 41 of relatively large diameter. The upper section 28 of the tubing string has elements complementary to and slidingly cooperative with these three guide portions, namely, a guide bushing 42 embracing the guide portion 39, a tubular portion 43 embracing the guide portion 40, and, finally, a terminal portion 44 embracing the guide portion 41.

The described sliding joint between the two sections of the tubing string is sealed by suitable packing. For this purpose a ring 46 is mounted on the lower tubing section 29 at the upper end of the guide portion 40, and the guide portion 40 is provided with an annular flange 47 spaced below the ring 46, the ring, flange, and guide portion 40 thus forming a space to receive a packing ring 48. A second packing ring 49 embracing the guide portion 40 is retained by a bushing 50 engaging the tubular portion 43 of the upper tubing string.

The annular space 52 around the guide portion 39 between the guide bushing 42 and the plate 46 will change in volume with relative movement between the two tubing sections. Since this space is above the two packing rings, it is desirable to provide suitable means for releasing fluid therefrom when the space contracts. For this purpose the bushing 42 may be provided with shallow radial bores 53 communicating through longitudinal bores 54 to the space 52.

The valve 30 is opened against the pressure of the spring 34 by relative movement between the tubing sections 28 and 29, the relative movement carrying the valve head 35 against the bushing 37 to unseat the valve member 32. It is desirable that relative movement between the two tubing sections be limited in a positive manner to prevent opening of the valve 30 until the test apparatus is installed in the bore hole, but subsequent to such installation sufficient downward movement of the upper tubing section against the stationary lower tubing section must be permitted for operation of the valve 30. In my preferred arrangement the lower tubing section is provided with a radial lug 56 at the guide portion 41 to cooperate with a slot generally designated 57 in the terminal portion 44 of the upper tubing section 28. This slot has a portion 58 of too limited vertical extent to permit opening of the valve 30 and has a second portion 59 that will permit relative movement sufficient to operate the valve, the lug being carried from one slot portion to the other by approximately a quarter turn of relative rotation between the two tubing sections.

The lower tubing section 29 carries a rathole packer 60 of any suitable type that is adapted to engage the upper end of the restricted bore 20, thereby to form with the tubing string an effective seal between the reduced bore 20 and the major portion of the well above the zone to be tested.

The present improvement of my apparatus includes a suitable single-circuit cable 61 that is played into the well as the tubing string 21 is lowered, the cable providing communication between a recording means 62 at the top of the well and a subterranean fluid-type commutator housing 63. The commutator housing 63 may be mounted at some suitable point on the tubing string 21, for example, just above or on the packer 60 as shown in the drawings. From the commutator housing 63 a multiple-circuit cable 65 extends through the packer 60 in a fluid-tight manner to provide electrical communication between the commutator housing and a plurality of detecting stations or test points represented by pairs of electrodes 66 distributed along the lower perforated portion 67 of the lower tubing section 29 below the packer.

Preliminary to the operation of my test apparatus, it is essential that the test zone of the bore hole below the packer 60 be filled with some conditioning fluid differing substantially in some characteristic from the encroaching water. In my preferred procedure the distinguishing characteristic is ohmic resistance, but my invention is not limited to dependence on this particular characteristic. In the usual procedure the conditioning fluid, which may be plain water or drilling mud, is introduced into the well to a height to overbalance the formation pressures and thereby hold in abeyance formation flow. To insure the requisite hydrostatic pressure, relatively heavy mud may be employed if necessary.

After the well is loaded with the conditioning fluid to a height to overbalance formation pressure, the tubing string 21 is lowered into the well with the lug 56 of the lower tubing section 29 engaging the restricted vertical portion 58 of the slot 57 in the upper tubing portion 28 of the string. The lower section 29 of the tubing string is suspended from the upper tubing section 28 by engagement of the lug 56 with the slot 57, but the limited vertical dimension of the portion 58 of the slot prevents sufficient relative axial movement between the two sections of tubing to cause the valve 30 to open.

The whole string of tubing 21 is initially empty except for atmospheric air or may contain a fluid column to provide a cushion. As the tubing string is lowered into the column of conditioning fluid in the well bore, some fluid will be forced into the perforated portion 67 of the tubing string and perhaps will be forced upwardly in the tubing string above the packer 60, but the valve 30 will remain closed to prevent any substantial upward flow through the tubing string. When the packer 60 seats into the top of the reduced portion 20 of the bore hole, static pressure of the fluid column above the packer acts upon the upper end of the packer, and the packer then becomes an effective annular seal to isolate the test zone below the packer from the major portion of the fluid column in the bore hole.

When the test apparatus is ready for operation in the well, the disposition being as indicated by Fig. 1, the upper tubing string 28 is manipulated to rotate the slot 57 into a position at which the lug 56 is in the relatively long vertical portion 59 of the slot. The upper section 28 of the tubing string is then moved downwardly to open the valve 30, the head 35 of the valve stem 33 striking the bushing 37 to open the valve.

Since the opening of the valve 30 establishes communication between the atmosphere and the test zone below the packer and since the test zone is under exceedingly high pressure, fluid immediately flows upwardly through the tubing string at a rate controlled by the aperture of the flow bean 25. With the lowering of pressure in the test zone, both fresh formation fluids and extraneous fluids previously driven into receptive strata of the test zone begin to flow into the test zone. As taught in my previously mentioned prior application the various pairs of electrodes 66 are used to determine changes in the character of fluid in the test zone throughout a test period, and the points of water ingress are derived from comparison of the histories of fluid changes at the various test points as represented by the pairs of electrodes.

One of the important advantages of my broad test method is that actual flow conditions are simulated in a relatively short period. If the whole bore hole were in communication with the test zone to permit extensive counter flow, a considerable volume of flow would be necessary to clear the test zone of conditioning fluid and to establish stable flow conditions or a relatively stable flow pattern in the test zone for reflection in the test record. By isolating the test zone in the manner described, however, I am enabled to displace the conditioning fluid completely from the test zone and to attain representative flow conditions therein within a relatively short period. Because only a relatively small volume of well fluid need be displaced for a conclusive test, because I dispense entirely with any preliminary groping for a critical hydrostatic pressure, and because the test continues without interruption for manipulation of test devices and without interruption for manipulation of recording devices, I am enabled to accomplish my object in a relatively short recording period.

In the usual test period three successive stages of flow in the test zone will be reflected by the record. The first of these stages is the initiation of well formation flow, this stage including the momentary effects of such flow initiation. The second stage of flow is the transition stage during which the fluid in the test zone at the beginning of the test is completely displaced from the test zone. The third stage is signalized by the attainment of a relatively stable flow pattern simulating actual production conditions. In this third stage the test zone is occupied entirely by formation fluids streaming through the test zone in a flow pattern determined by the distribution of points of ingress, relative pressures and volumes, and the characteristics of the different formation fluids.

While the above procedure is described as employed for testing a well having a lower uncased portion of reduced diameter, it is apparent that the same procedure involving other well known types of packers may be employed if the test zone is cased.

Figure 2:
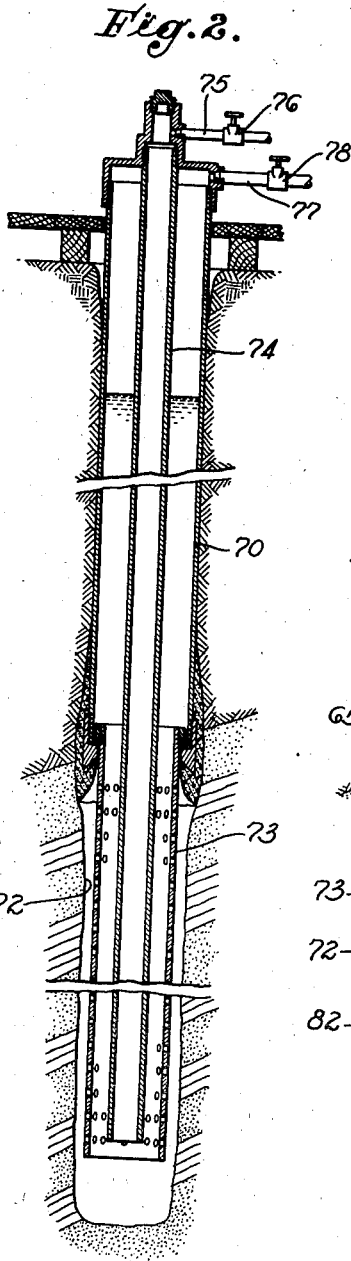
Fig. 2 is a diagrammatic section of a cased well being conditioned for a second practice of my invention.
Figure 3:
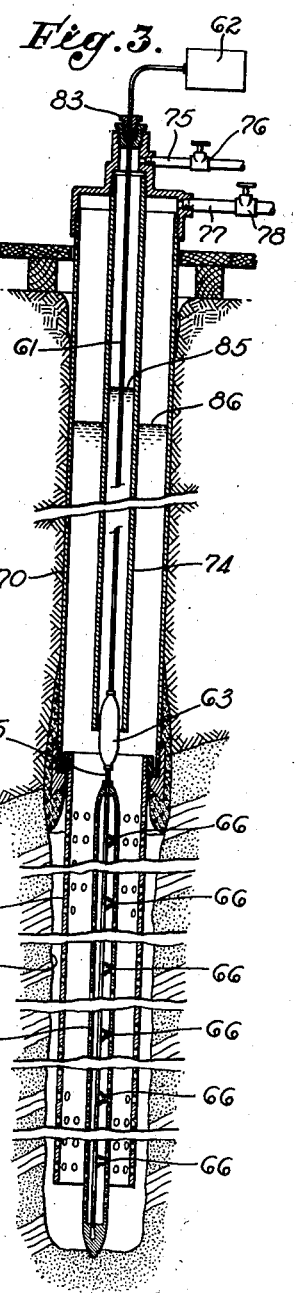
Fig. 3 is a similar view of the well in the course of my second test procedure.

Various other test procedures in the practice of my invention may be followed by those skilled in this art. One such procedure, for example, may be understood by referring to Figs. 2 and 3, Fig. 2 showing a well in a preparatory stage of a test, and Fig. 3 showing the well in the course of a test procedure. The major portion of the bore hole is protected by a casing 70, but the zone to be tested lies in a lower uncased portion 72 into which extends the usual perforated liner 73.

Preparatory to testing such a well a string of tubing 74 is lowered into the test zone and the top of the well is sealed off. At the top of the well the tubing 74 communicates with a pipe 75 controlled by a valve 76, and the annular space between the casing 70 and the tubing 74 communicates with a second pipe 77 controlled by a valve 78. All the well fluids in the bore hole may be readily replaced in a well known manner by simply pumping conditioning fluid into the well through one of the pipes 75 or 77 and permitting fluid to flow from the well through the other of these pipes until the discharged fluid is substantially free of well fluids. The tubing 74 is then withdrawn to a level above the test zone as shown in Fig. 3, and the previously described single-conductor test cable 61 is lowered into the well. The test cable 61, which is in communication with the recording means 62 at the top of the well, carries the usual commutator housing 63 from which is suspended the multiple-circuit cable 65 carrying the spaced pairs of electrodes 66. Any suitable arrangement may be employed for making the cable taut, for example, the lower portion of the cable may be strung in a perforated casing 82 carried by the cable 65. The well will be sealed by employing a packing gland 83 where the cable enters the tubing.

A condition is then sought that will simulate in the test zone normal production flow. To this end I may introduce a gas or compressed air through either pipe 75 or pipe 77 to attain a status in which flow of formation fluids into the test zone is held in abeyance by the weight of the conditioning fluid in the well plus the pressure of gas on the fluid, the fluid itself not being of sufficient weight alone to overbalance formation pressure. To achieve this state, it will usually be necessary, first, to introduce enough conditioning fluid to overbalance formation pressure while the test cable is being installed and then, after sealing the top of the well, to introduce gas through one of the two pipes 75 and 77 to a sufficient extent to force a considerable volume of the conditioning fluid out of the well through the other pipe.

After the desired combination of gas pressure and liquid pressure is achieved, flow is initiated in the test zone merely by opening whichever one of the valves 76 and 78 communicates with the compressed gas body above the liquid column. For example, if the requisite amount of gas is introduced through the pipe 77 to force the requisite amount of conditioning fluid out of the well through the pipe 75, subsequent closing of the valve 76 to shut off the pipe 75 and the partial opening of the valve 78 to open the pipe 77 will cause the liquid in the well to take, say, the level 85 in the tubing 74 and the level 86 in the annular space around the tubing. Continued release of gas subsequently through the pipe 77 will eventually reduce static pressure in the test zone sufficiently to permit formation fluids to flow into the test zone. If desired, flow may be stopped immediately after initiation to record the results of diffusion in the test zone, or flow may be continued until a relatively stable flow pattern is indicated.

Throughout such a test procedure, the pairs of electrodes 66 are stationary in the well at the selected detecting stations and the test procedure is carried out without interruption, it being necessary merely to manipulate the valve that controls release of gas from the well. The recording means 62 may be continuously observed by the operator for guidance in manipulating the gas valve. It will be apparent to those skilled in the art that several of the well known gas-lift methods may be employed to cause and maintain well flow in carrying out my methods.

My invention may also be practiced with the apparatus of Figs. 2 and 3 by first conditioning a well and then, with the top of the well open, swabbing out conditioning fluid until the hydrostatic pressure drops below formation pressure. Flow of formation fluids into the test zone will then commence and will continue for a substantial period if the well is unbalanced by a substantial margin. The test cable 61 carrying the several pairs of electrodes 66 may then be lowered into the well for continuous observation over a period of flow to ascertain the pattern of flow in the test zone. This latter practice, however, obviously lacks several important advantages of the previously described methods and furthermore involves considerable risk of the well blowing out, especially if the well has relatively high formation pressures.

My invention may also be used to obtain data about subterranean fluids while a flowing well is in normal operation and without interrupting production. The cable with its attachments may be introduced into the well without releasing the well from pressure by procedures well known in the art, It may be desirable to keep a cable in the well over long periods of time for intermittent tests at various levels, the recording apparatus being connected to the cable at the surface only during test periods. In such event, the motor of the subterranean commutator may be energized by current from the cable.

Fig. 4 indicating the preferred arrangement of my improved recording system shows five pairs of the previously mentioned electrodes designated 66a—66e carried by the previously mentioned multiple-circuit cable, generally designated 65.

Fig. 4 also shows diagrammatically the commutator housing 63 from which the multiple-circuit cable 65 depends. The single-circuit cable 61 that leads to the top of the well from the conductor housing 63 is represented in Fig. 4 by two conductors 90 and 91, one of which as heretofore suggested may be a conductive cable sheath and the other of which may be a single insulated wire encased by the sheath.

Within the fluid-tight commutator housing 63 is a cyclic means or commutator that includes a switch arm 92 on a shaft 93 that is driven by a constant speed motor 95. In the preferred form of my invention the motor 95 is a simple spring-actuated motor capable of operation continuously for several hours on stored energy. It is contemplated that the shaft 93 will be turned at a constant speed of one revolution every second or in some tests every few seconds. The switch arm 92 in each revolution of the shaft 93 sweeps five contacts 96a—96e corresponding to the pairs of electrodes 66a—66e and also sweeps a sixth contact 97 which may be termed the cycle-differentiating contact.

The conductor 90 from the cable 61 is connected to five wires 98 in the lower cable 65, the five wires being connected respectively to one electrode in each of the pairs of electrodes 66a—66e. The lower cable 65 further includes five wires 100, which connect the five contacts 96a—96e respectively with the second electrode in each of the pairs of electrodes 66a—66e. In addition to being connected to the five wires 98 the conductor 90 is connected through a resistance 101 to the previously mentioned cycle-indicating contact 97. The conductor 91 of the cable 61 is connected to the rotating switch arm 92.

It is apparent that if the conductors 90 and 91 are connected to a suitable source of current and if the switch arm 92 is rotated at constant speed by the motor 95, the various pairs of electrodes 66a—66c will be electrically connected successively in repeated cycles with the circuit through the wires 90 and 91, and the resultant successive variations of current through the cable 61 will represent fluid character values at the various test points represented by the various pairs of electrodes. The particular arrangement shown in Fig. 4 will result in a signal cycle through the cable 61 comprising five successive impulses of current corresponding to the five pairs of electrodes 66 and a sixth impulse of current through the resistance 101 to indicate the end or the beginning of the signal cycle. In some practices of the invention the contact 97 and the resistance 101 may be omitted to provide a time gap for the differentiation of the successive signal cycles.

To complete the apparatus it is necessary to provide some indicating or recording means responsive to the impulses of current through the cable 61 to enable the operator to compare the histories of fluid-character changes at the subterranean test points through the test period. For this purpose the previously mentioned recording means 62 may include the elements shown diagrammatically in Fig. 4. The principal elements include a transformer 102, a Wheatstone bridge generally designated 103, a rectifier 105, a mirror-galvanometer 106, and means driving a ribbon 107 of photographic film on which a record is traced by the mirror-galvanometer.

The primary terminals of the transformer 102 are connected with a suitable A. C. source 108 by a pair of wires 110, and the secondary terminals of the transformer are connected to the Wheatstone bridge 103 by a pair of wires 111. One of the wires 111 is in direct communication with conductor 91 of the cable 61 as shown in the drawings. The A. C. input side of the rectifier 105 is connected to the Wheatstone bridge by wires 112, and one of the wires 112 is connected with the conductor 90 of the cable 61. The wiring diagram is completed by a pair of wires 113 connecting the D. C. output side of the rectifier 105 with the mirror-galvanometer 106. In the well known manner a beam of light 115 from a suitable source 116 is reflected by the mirror 117 of the galvanometer onto the ribbon of film 107. During the test period the film 107 is unwound from a magazine spool 118 onto a spool 120 driven through a shaft 121 by a suitable motor 122.

Preliminary to a test the spring-actuated motor 95 is wound and set into motion to run continuously while the cable is being lowered into the well and throughout the subsequent test period. The electrical system in the recording means is not energized until it is desirable to start recording data on the film 107.

During the recording period the rotating switch arm 92 alternately makes and breaks the circuit through the cable 61 as it alternately touches one of the commutator contacts and moves into a dead space between contacts. As a result of the commutator action current flows intermittently through the cable 61 in short impulses, there being six impulses per second if the commutator makes one rotation per second, and these impulses cause successive oscillations of the reflected light beam 115.

The arrangement is such that the position of the beam is toward the left edge of the film 107 when no current is flowing through the mirror-galvanometer 106. The left edge of the film may be regarded as corresponding to infinite or at least exceedingly high resistance in the cable circuit, and it is apparent that the range of the sweep of the reflected light beam towards the right edge of the film will be determined by the extent to which resistance in the circuit is lowered when one of the commutator contacts is touched by the switch arm 92.

Figure 5:
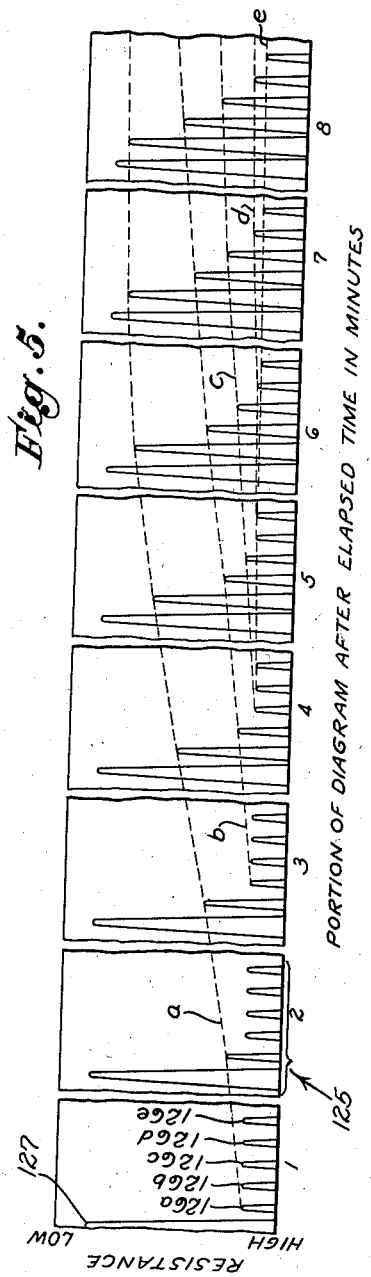
Fig. 5 shows a progressive series of selected portions of a continuous record ribbon as produced by the apparatus of Fig. 4.

In the particular arrangement shown in Fig. 4 it is contemplated that the value of resistance 101 will be relatively low and preferably lower than any probable resistance on the part of the well fluids across the pairs of electrodes 66. In the operation of such an arrangement the individual impulses of current will cause individual hairpin curves to be traced on the film as indicated in the drawings and the curves resulting from impulses of current through the resistance 101 will have the greatest length, i. e. lowest resistance rating. As shown in Figs. 4 and 5 the record traced on the film 107 consists of successive cycles 125 of six curves each, each cycle comprising five fluid-character-indicating curves 126a—126e resulting from flow across the respective pairs of electrodes 66a—66c, and a sixth curve which may be termed a cycle-differentiating curve 127, this last curve resulting from flow through the resistance 101. If all of the curves 127 of the various cycles exceed the values of all the curves 126, the division of the record into individual cycles may be ascertained at a glance, but even, if some of the curves 126 exceed the curves 127 the cycle points may be easily ascertained because the lengths of all the curves 127 will be uniform at a predetermined value throughout the test period.

Fig. 5 shows a progressive series of fragments from a typical developed film 107 showing cycles at 60-cycle intervals in the continuous record. In other words, each fragment represents the status of the fluid pattern in the well as taken at one minute intervals. Fig. 5 is broken up into the spaced fragments merely to emphasize the rates of change in fluid character. One procedure for breaking down the composite series of values represented by the film record to arrive at the component series of values corresponding to the individual pairs of electrodes 66 is simply to lay off lines on the film interconnecting corresponding values or curves 126 of all the cycles 125. Thus, in Fig. 5 a dotted line designated $a$ interconnects the curves 126a of the successive cycles and the curves $b$, $c$, $d$, and $e$ in similar manner interconnect corresponding curves 126b—126e of the successive cycles. It is apparent that the curves $a$—$e$ represent the individual histories of change in fluid character at the selected test points in the well, and that each of the curves reflects any change in fluid character having a duration greater than one second.

While the values on which the curves are based are not, in fact, derived simultaneously nevertheless the derived curves are in effect simultaneous and represent complete simultaneous histories of phenomena at the selected test points. Since the histories are complete and simultaneous, they may be readily compared, and the time relationships of fluid changes so vital in interpreting the test data are readily apparent from the space relationships on the completed record.

Fig. 5, for example, shows that salt water encroached initially in the region of the test point represented by the pair of electrodes 66a, but there was no change in fluid characters at any other test point for the following three minutes. After three minutes the change in fluid character became apparent successively at the other test points. Such a record would clearly indicate, then, that salt water enters the bore hole in the region of the electrode 66a and only at the region of the electrode 66a. No one cycle gives the answer; a series of cycles is required and the data are reliable only if the series of cycles affords as complete information as the strictly continuous and strictly simultaneous determinations of value achieved in my earlier disclosure. The data recorded by the arrangement described herein are complete and thoroughly reliable and yet involve the use of only a single circuit in the cable that extends down the well bore from the recording cabinet.

Figure 6:
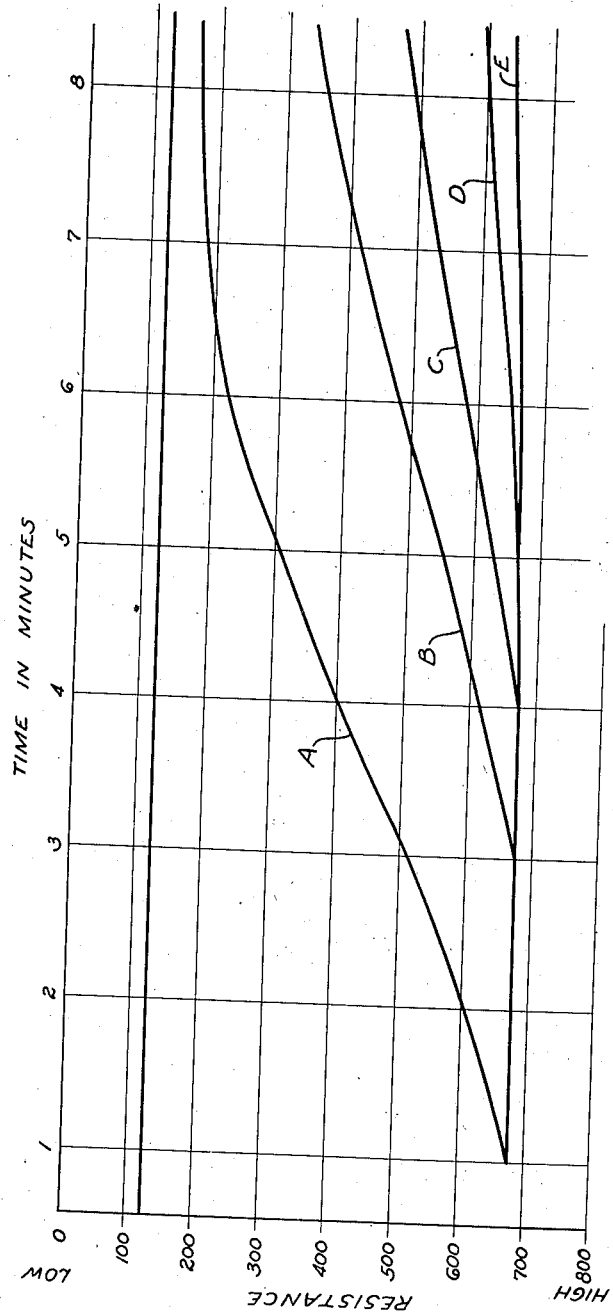
Fig. 6 shows a series of data curves derived from the record shown in Fig. 5.

The purpose of adding Fig. 6 is to illustrate an alternative procedure in which a chart generally designated 128 is derived from the film record on an abridged time scale to disclose the results of the test at a glance. The curves A—E of Fig. 7 correspond to the curves $a$—$e$ of Fig. 5 and impart identical information.

In the foregoing discussion the possibility was suggested of omitting the contact 97 and resistance 101 in the described system so that the current impulses of a cycle of impulses will be grouped together and the cycles distinguished on the final record by space relationships. If the contact 97 and the resistance 101 are omitted, the resultant record on the film will appear as shown in Fig. 7. In Fig. 7 each cycle 125 of individual curves 126a—126e is separated from its successor by a gap or spacing 129.

The system as described here involves the use of only one commutator and avoids the problem of synchronization by employing what may be termed a cycle-differentiating record pattern. It will be apparent to those skilled in the art, however, that the classifying and segregating of the resistance values may be made at the surface of the well as fast as the values are received thereby to produce the individual histories of the test points concurrently as the test proceeds. Fig. 8 illustrates how such an arrangement may be made at the surface of the well.

The modification represented by Fig. 8 affects only that part of the recording arrangement on the D. C. output side of the rectifier 105, the remaining parts of the system on the A. C. input side of the rectifier and in the well being the same as shown in Fig. 4. Fig. 8 shows diagramatically a commutator generally designated 130 that includes a rotary switch arm 131 and a non-conductive disc 132 carrying five contacts 136a—136e and a sixth contact 137, the six contacts being preferably equally spaced. The five contacts 136 correspond to the five contacts 96 of the subterranean conductor and therefore correspond to the subterranean pairs of electrodes 66a—66e. The disc 132 is normally stationary but is mounted on a shaft 138 to permit rotational adjustment, the shaft having a series of six slip rings 140 that are connected by concealed conductors (not shown) respectively to the five contacts 136 and the sixth contact 137 on the disc. Five of the slip rings 140 corresponding to the contacts 136a—136e are electrically connected by brushes 141 and wires 142 to five individual recording devices 146a—146e respectively, and the recording devices are connected by wires 147 to a lead 148 from the D. C. output side of the rectifier 105. The sixth slip ring 140 corresponding to the sixth contact 137 is electrically connected to an ammeter 150 through a brush 141 and a wire 151, and the second terminal of the ammeter is connected to the previously mentioned lead 148 through a wire 152. The circuit through the commutator 130 is completed by a second lead 153 from the D. C. output side of the rectifier 105 to a brush 154 in contact with a slip ring 155 on a shaft 156 that carries the switch arm 131, the slip ring being electrically connected to the switch arm.

The shaft 156 is operated by a spring-actuated motor 157 and is actuated in an intermittent manner by virtue of an escapement comprising an escape wheel 158 on the shaft and a cooperating escapement lever 160, the escape wheel having twelve teeth 161. The escapement lever 160, which is mounted on a pivot 162, is adapted to be moved in one direction by a spring 163 and in the opposite direction by a solenoid 165. It is contemplated that the solenoid 165 will be effectively energized in response to each recurring impulse of current from the rectifier 105. For example, the solenoid coil may be in series with a battery 166 and the movable contact 167 of a normally open relay 168, the relay being connected by wires 170 across the two leads 148 and 152 from the rectifier 105.

In employing the arrangement shown in Fig. 8 the test cable is lowered into the well with the subterranean commutator. In preparation for a test period the operator energizes the A. C. input side of the rectifier 105 and starts operation of the motor 157 to rotate the switch arm 131.

Each time an impulse of current from the rectifier 105 energizes the relay 168 the solenoid 165 swings the escapement lever 160 to the right to permit the escape wheel to advance one tooth or one-twelfth revolution and upon subsequent deenergization of the relay 168 the spring 163 returns the escapement lever 160 to the left to permit the escape wheel again to advance one tooth. If the subterranean commutator rotates one revolution in a given period of time six impulses of current will be delivered by the rectifier 105 and twelve times in that period the switch arm 131 will jump one-twelfth revolution or one-sixth revolution for each impulse.

The escapement arrangement is such that rotation of the escape wheel 158 in response to the solenoid-actuated movement of the escapement lever 160 to the right brings the switch arm 131 into registry with a contact on the disc 132 and the spring-actuated movement of the escapement lever moves the switch arm to a dead space between contacts. By virtue of such an arrangement, the switch arm 131 will pause at each contact on the disc 132 so long as an impulse of current endures and leaves the contact only when the impulse of current terminates and the spring 163 moves the escapement lever 160 to the left. Consequently a circuit is maintained through one of the recording devices 146 so long as current passes through the subterranean commutator and the switch arm 131 at the top of the well advances to a dead space of the disc 132 only when the subterranean switch arm 92 advances to a dead space between contacts of the subterranean commutator.

The next step in preparation for the test is to manually rotate the disc 132 until the commutator at the top of the well is in phase with the subterranean commutator. To achieve the required synchronization the operator rotates the disc 132 slowly until the ammeter 150 recurrently shows a constant predetermined value indicating current through the subterranean resistance 101. In other words, the ammeter 150 is placed in step with the contact 137 to receive current when the switch arm 131 touches the contact 137. Only when the ammeter is in step with the contact 137 will the ammeter readings be constant at the predetermined value. Once the commutator 130 is synchronized with the subterranean commutator in the described manner the individual recording device 146a will receive only impulses of current representing resistance across the corresponding subterranean pair of electrodes 66a and in like manner the recording devices 146b—146e will receive impulses of current reflecting the fluid character respectively at the other test points represented by the pairs of electrodes 66b—66e.

The apparatus employed in each of the individual recording compartments 146 may include a mirror-galvanometer and a moving ribbon of film to function in the manner shown in Fig. 4 and previously described or may involve any other suitable recording means. Each of the various records produced in the devices 146 will be confined to the resistance values taken at a single test point and the resultant five individual records will be the concurrent histories of fluid changes at the test points. To ascertain points and character of fluid ingress it is merely necessary to juxtapose the five film ribbons from the five recording devices for comparison.

The devices and methods described specifically herein for the purpose of disclosure and to illustrate the principles involved will suggest to those skilled in the art various changes and substitutions under my basic concept, and I reserve the right to all such departures from my specific disclosures that fall within the scope of my appended claims.

I claim as my invention:

1. A method of determining the points of ingress of formation fluids in a bore hole, including the steps of: loading said bore hole with fluid to overbalance formation pressure sufficiently to prevent flow of formation fluids thereinto; drawing off fluid from the bore hole to initiate flow of formation fluids thereinto; and determining fluid character at each of a plurality of predetermined spaced stationary points in the bore hole repeatedly at relatively short time intervals in a test period to produce a plurality of series of sufficiently closely successive readings over coextensive time periods to produce contemporaneous histories of significant changes in fluid character occurring at said predetermined points during the test period.

2. A method of determining the points of ingress of formation fluids in a bore hole, including the steps of: loading said bore hole with fluid to overbalance formation pressure sufficiently to prevent flow of formation fluids thereinto; drawing off fluid from the bore hole to initiate flow of formation fluids thereinto; and determining fluid character at predetermined spaced stationary points in the bore hole in sequence at relatively short time intervals in closely repeated cycles in a test period to produce substantially coextensive series of closely successive readings corresponding to said predetermined points revealing significant changes in fluid character occurring simultaneously at said predetermined points during the test period.

3. A method of determining the points of ingress of formation fluids in a bore hole, including the steps of: loading said bore hole with fluid to overbalance formation pressure sufficiently to prevent flow of formation fluids thereinto; sealing off a test zone of the bore hole; drawing off fluid from said sealed test zone to initiate flow of formation fluids thereinto; and determining fluid character at each of a plurality of predetermined spaced stationary points in said test zone repeatedly at relatively short time intervals in a test period to produce a plurality of series of sufficiently closely successive readings over co-extensive time periods to produce contemporaneous histories of significant changes in fluid character occurring at said predetermined points during the test period.

4. A method of employing means responsive to changes in fluid character for the purpose of determining the relative character and location of formation fluids communicating with a bore hole, said method including the steps of: loading said bore hole with fluid to overbalance formation pressure sufficiently to prevent flow of formation fluids thereinto; lowering a plurality of said responsive means into the bore hole to fixed positions to respond to changes in fluid character at spaced stationary points in the bore hole; drawing off fluid from the bore hole to initiate flow of formation fluids thereinto; and determining the response of each of said fluid-character-responsive means repeatedly throughout a test period to produce without mechanical agitation of the fluid in the bore hole a plurality of substantially coextensive series of successive readings reflecting significant changes in fluid character occurring simultaneously at said predetermined points during the test period.

5. A method of employing a recording means and means responsive to changes in fluid character for the purpose of obtaining data about fluids in a bore hole, said method including the steps of: lowering a plurality of said responsive means into the bore hole to fixed positions to respond to changes in fluid character at spaced stationary points in the bore hole; operatively connecting said plurality of fluid-character-responsive means in turn with said recording means in repeated cycles throughout a test period while said fluid-character-responsive means are stationary to produce a composite series of determinations; and deriving from said composite series of determinations individual series of determinations for the individual fluid-character-responsive means having the character of contemporaneous histories of significant changes in fluid character occurring at said predetermined points during said test period.

6. A method of employing an electrically responsive recording means and means responsive to changes in fluid character for the purpose of obtaining data about fluids in a bore hole, said method including the steps of: lowering a plurality of said responsive means into the bore hole to fixed positions to respond to changes in fluid character at spaced stationary points in the bore hole; lowering a conductor into the bore hole along with said responsive means to connect each of said responsive means with one side of the recording means; electrically connecting the other side of said recording means with each of said responsive means in sequence in repeated cycles throughout a test period while said responsive means are stationary to produce a composite series of determinations; and deriving from said composite series of determinations individual series of determinations for the individual responsive means having the character of contemporaneous histories of significant changes in fluid character occurring at said predetermined points during said test period.

7. A method as set forth in claim 6 that includes the step of sending said signals in a time pattern revealing the separate cycles of signals.

8. A method as set forth in claim 6 that includes the step of sending cycle-distinguishing signals to said recording means through said conductor to identify separate cycles in said composite series of determinations.

9. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means providing a signal circuit for electrical response to said responsive means; cyclic means to responsively relate said signal circuit to said responsive means in sequence in repeated cycles; and indicating means responsive to said signal circuit.

10. An apparatus as set forth in claim 9 in which said cyclic means operates in a time pattern revealing the separate cycles of signals.

11. An apparatus as set forth in claim 9 in which means is provided to send cycle-distinguishing signals through said signal circuit to differentiate cycles of signals from each other.

12. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means providing a signal circuit to the surface of the well for electrical response to said responsive means; subterranean cyclic means to responsively relate said signal circuit to said responsive means in sequence in repeated cycles; and indicating means at the surface of the well responsive to said signal circuit.

13. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means providing a signal circuit to the surface of the well for electrical response to said responsive means; a subterranean automatic cyclic means to responsively relate said signal circuit to said responsive means in sequence in repeated cycles; and means at the surface of the well responsive to said circuit to make a single record of the signals in sequence.

14. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means providing a signal circuit to the surface of the well for electrical response to said responsive means; a subterranean automatic cyclic means to responsively relate said signal circuit to said responsive means in sequence in repeated cycles; means to send cycle-differentiating signals through said signal circuit; and means at the surface of the well responsive to said circuit to make a single record of the signals in sequence including said cycle-differentiating signals.

15. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means to seal off said test zone from the major portion of the bore hole; valve means to release fluid from said sealed test zone to reduce pressure in the test zone thereby to favor initiation of formation flow into the test zone; means providing a signal circuit for electrical response to said responsive means; cyclic means to responsively relate said signal circuit to said responsive means in sequence in repeated cycles; and indicating means responsive to said signal circuit.

16. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means to seal off said test zone from the major portion of the bore hole; valve means to release fluid from said sealed test zone to reduce pressure in the test zone thereby to favor initiation of formation flow into the test zone; means providing a signal circuit to the surface of the well for electrical response to said responsive means; subterranean cyclic means to responsively relate said signal circuit to said responsive means in sequence in repeated cycles; and indicating means at the surface of the well responsive to said signal circuit.

17. An apparatus for obtaining data about fluids in a well bore comprising: a plurality of means each responsive to changes in fluid character immediately adjacent each of said means; a cable extending into the bore hole from the surface of the well to support said responsive means at predetermined spaced points in a selected zone of the bore hole for the duration of a test period, said cable including conductor means for establishing a signal circuit to the surface of the well; cyclic means carried by said cable at a subterranean point to responsively relate said signal circuit to said responsive means in sequence in repeated cycles; and indicating means at the surface of the well responsive to said signal circuit.

18. An apparatus for obtaining data about fluids in a well bore, comprising: a plurality of means each responsive to changes in fluid character immediately adjacent each of said means; means to support said responsive means at predetermined spaced points in a selected zone of the bore hole for the duration of a test period; means providing a signal circuit for electrical response to said responsive means; subterranean cyclic means to responsively relate said signal circuit to said responsive means in sequence in repeated cycles; a plurality of indicating means at the top of the well corresponding to said plurality of responsive means; and a second cyclic means synchronized with the first cyclic means to responsively relate said indicating means to said signal circuit.

19. An apparatus as set forth in claim 18 in which said subterranean cyclic means is adapted to send cycle-differentiating signals through said signal circuit for guidance in the synchronizing of said second cyclic means with the subterranean cyclic means.

20. An apparatus as set forth in claim 18 in which said second cyclic means is regulated by the signal impulses through said signal circuit.

JOHN R. GILLBERGH.